March 10, 1959     H. K. FARR ET AL     2,877,434
MODE FILTER
Filed Nov. 19, 1945
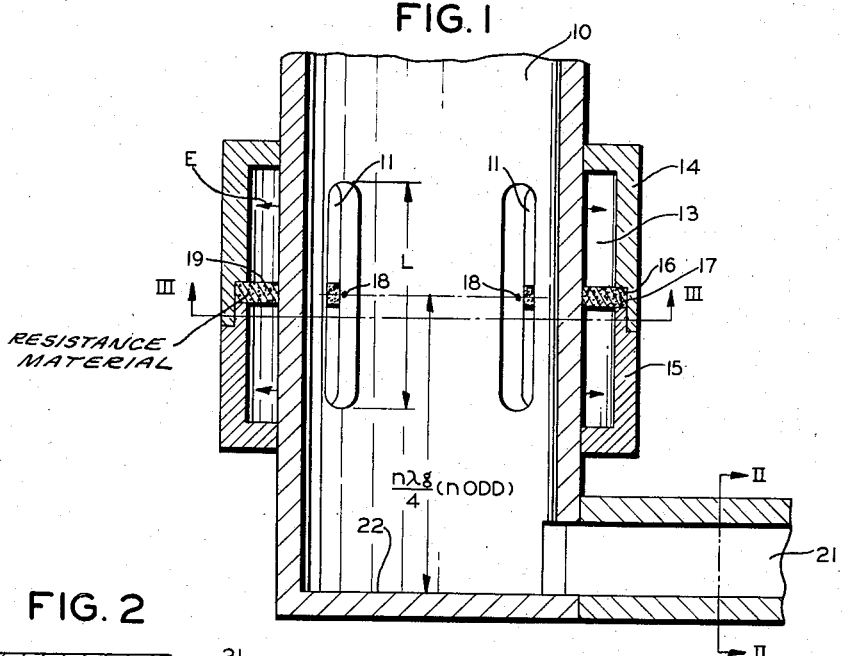
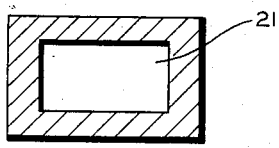
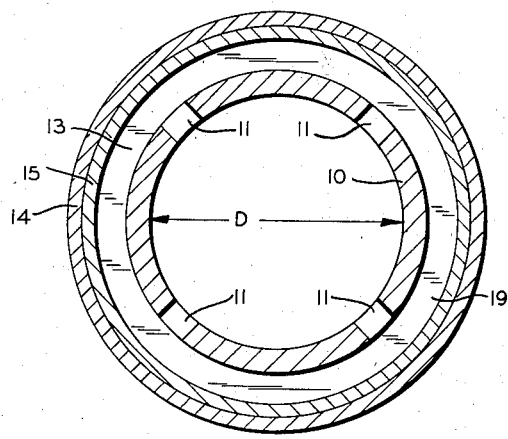
INVENTORS
HAROLD K. FARR
F. EDWARD EHLERS
BY
ATTORNEY United States Patent Office 2,877,434
Patented Mar. 10, 1959

2,877,434

MODE FILTER

Harold K. Farr, Boston, and F Edward Ehlers, Cambridge, Mass., assignors, by mesne assignments, to the United States of America as represented by the Secretary of the Navy Application November 19, 1945, Serial No. 629,670

3 Claims. (Cl. 333—98)

This invention relates to a wave guide transmission line system and more particularly, to mode filtering apparatus therefor.

Frequently in employing wave guides as transmission lines, it is desirable to transmit electric waves in a mode other than the lowest mode that can be carried by the wave guide. In such a case, the lower mode may exist in a small quantity such that undesirable resonances may be set up in the system if each end of the wave guide is not matched to the lower mode. For example, in cylindrical wave guides, it is often desirable to transmit electro-magnetic waves in the $TM_{01}$ mode since this is a mode of radial symmetry. However, this mode requires that the diameter of the wave guide shall be no smaller than $0.77\lambda$, where $\lambda$ is the wave length in free space of the energy being propagated. At such a diameter, a lower mode, the $TE_{11}$ mode, will also be propagated, since this mode is propagated at diameters above $0.59\lambda$.

It is a specific object of this invention to provide a mode absorber for selectively removing the $TE_{11}$ mode of oscillation from a wave guide in which it is desired to carry only energy in the $TM_{01}$ mode, thus eliminating undesirable resonances. Broadly, this invention accomplishes the above and other objects by providing means for selectively coupling energy in the undesired mode out of the wave guide and into a cavity which will propagate that energy, and attenuating such energy in the cavity so that none can return to the wave guide, thus leaving only the desired mode in the wave guide.

It is, therefore, an object of the present invention to provide a mode filter of the type being discussed which will remove and absorb a high percentage of the undesired mode energy from the wave guide system.

It is still another object of this invention to provide an absorbing cavity for such a mode filter which will take up relatively little space and conform to the shape of a cylindrical wave guide.

It is still a further object of this invention to provide such a cavity that will have the general cross-sectional shape of a rectangular wave guide and to provide in this rectangular wave guide an attenuating means such as resistance material at the high voltage point which will be matched to the impedance of the rectangular wave guide and attenuate substantially all the energy absorbed into the cavity.

The above and other objects of the present invention will become apparent upon a careful consideration of the following detailed description when taken together with the accompanying drawing, the figures of which illustrate a typical embodiment of the invention.

In the drawing:

Fig. 1 illustrates in longitudinal section, a mode filter of my invention as applied to a cylindrical wave guide;

Fig. 2 is a cross section on line II—II of Fig. 1; and

Fig. 3 is a cross section taken along line III—III in Fig. 1.

In Figs. 1 and 3, a wave guide 10 of cylindrical form has one or more slots 11 of length L cut in its wall and arranged circumferentially thereabout. The wave guide 10 is of a diameter D sufficiently great to permit the passage therethrough of energy in the $TM_{01}$ mode at the operative frequency, and will, therefore, also permit the passage of energy in the $TE_{11}$ mode as hereinabove set forth. The length L of the slots 11 is preferably equal to one-half the length of a wave in the wave guide 10 of energy in the $TE_{11}$ mode, and these slots are each resonant to such waves. In order that a maximum amount of energy in the undesired $TE_{11}$ mode may be coupled out of the wave guide 10 through the slots 11, these slots are placed in pairs 180° apart in the wall of the wave guide 10, since energy in the $TE_{11}$ mode induces currents in the wall of the wave guide 10 which are maximum at positions 180° apart circumferentially in the said wall. The provision, therefore, of two pairs of slots 11, resulting in four slots spaced 90° apart circumferentially around the wall of the wave guide 10, obtains maximum coupling out of energy in the $TE_{11}$ mode for all polarizations in the wave guide 10 of the said $TE_{11}$ mode.

An annular cavity 13 which is responsive to the energy in the $TE_{11}$ mode that is coupled out of the wave guide 10 through the slots 11 is provided contiguous with and wrapped around the outside of the wave guide 10 and enclosing the slots 11. The cavity 13 is formed by two adjacent flanged annular members 14 and 15 of conductive material arranged to overlap at their adjacent edges and present a space between shoulders 16 and 17 on said adjacent edges for purposes to be hereinafter described, and at the same time, form a continuous outer wide and two lateral narrow walls for the cavity 13. The outer wall of the wave guide 10 forms an inner wide wall for the cavity 13 so as to complete this cavity. In cross-section, the cavity 13 resembles a rectangular wave guide and this cavity oscillates or accepts energy as a rectangular wave guide from the slots 11. The E-vectors of such energy are, therefore, similar to conventional E-vectors for a rectangular wave guide oscillating in the $TE_{01}$ mode for rectangular wave guides. The slots 11 are so arranged with respect to the cavity 13 that their center points 18 lie substantially along the center line of the inner wide wall of the annular cavity 13. An annular sheet of resistive material 19 is held between the shoulders 16 and 17 of the members 14 and 15 of the outer wide wall of the cavity 13 and makes electrical contact between the two wide walls of the cavity 13 in the manner of a conductor connected between the center lines of the two wide walls of a rectangular wave guide.

In operation, energy in the $TM_{01}$ mode is fed into the cylindrical wave guide 10. Concomitant energy in the $TE_{11}$ mode which is undesired is coupled out of the cylindrical wave guide 10 through the thereunto resonant slots 11 into the cavity 13, and such energy oscillates in that cavity in the $TE_{01}$ mode for rectangular wave guides. The maximum electric field of this mode is found in the center of the rectangular wave guide between the center lines of the two wide walls thereof. The resistive material 19 connected between these two wide walls in the region of maximum electric field density provides attenuation for the energy in the cavity 13 so as to reduce the amount of that energy. It is desirable that the resistance of the resistive material 19 shall be such that it is matched to the impedance of the rectangular wave guide 13, namely about 400 ohms per square portion of the resistive material. Thus the filter of this invention provides for the removal from the cylindrical wave guide 10 of energy in an undesired mode, the $TE_{11}$ mode in the present instant, and the attenuation of that energy so that relatively none can be returned to the cylindrical wave guide 10. As will be appreciated by those skilled in the art, longitudinally arranged slots 11 will remove energy in the $TE_{11}$ mode since that energy induces transversely directed currents in the wall of the cylindrical wave guide 10, which can be readily coupled out by longitudinally disposed slots. Energy in the desired $TM_{01}$ mode, however, has only longitudinally directed currents and these currents will not be affected by the longitudinally disposed slots 11. Thus energy in the desired $TM_{01}$ mode will proceed unhampered and unattenuated through the cylindrical wave guide 10, while energy in the undesired $TE_{11}$ mode will be removed from that wave guide.

In Fig. 1, the invention is illustrated as embodied in a device for transforming energy between a rectangular wave guide system and a cylindrical wave guide system and thus includes a rectangular wave guide 21 coupled to the cylindrical wave guide 10 in a known and usual fashion. Energy in the $TE_{01}$ mode in the rectangular wave guide 21 will be converted in known fashion to energy in the $TM_{01}$ mode for cylindrical wave guides upon entering the cylindrical wave guide 10, with accompanying energy in the $TE_{11}$ mode. When a mode transformer, such as that illustrated in Fig. 1, is the apparatus in which the mode filter of my invention is used, it is further desirable that the line of the center points 18 of the slots 11 shall be located a distance substantially equal to an odd number of quarter wave lengths in the wave guide for energy in the undesired $TE_{11}$ mode from the closed end 22 of the cylindrical wave guide 10. Such an adjustment is well known to those skilled in the art.

As will be appreciated by those skilled in the art, the mode filter of my invention may be used to selectively remove energy in any mode from a wave guide merely by properly disposing resonant slots such as the slots 11 herein described or other energy coupling means in the wave guide and providing a cavity and attenuating means therein for absorbing such undesired energy. Thus the application of my invention should not be limited to the embodiment of the invention herein disclosed but rather it is intended that the invention shall be considered as broadly applicable to any wave guiding system. Therefore, the invention is not to be limited except as may be required by the prior art and the spirit of the appended claims.

What is claimed is:

1. In a wave transmitting system having a cylindrical conductive wall and adapted to guide electro-magnetic waves therein in first and second modes that tend to produce first transversely directed and second longitudinally directed currents respectively in said wall, a mode absorber comprising, an annular chamber of rectangular cross-section adapted for response to wave in said first mode formed as a rectangular wave guide having coaxial cylindrical wide walls and disposed contiguously on the outside of said cylindrical wall, at least one longitudinally disposed slot in said wall leading into said chamber of a length substantially equal to half the length of a wave in said first mode and adapted to transfer waves in said first mode through said wall into said chamber, and an annular sheet of resistive material in said chamber electrically connecting said wide walls substantially in the region where the electric field is greatest.

2. In a wave transmitting system including a cylindrical wave guide having a diameter sufficiently great to permit the passage of electro-magnet waves in the $TM_{0,1}$ and the $TE_{1,1}$ modes at the operative frequency, a mode absorber for removing said $TE_{1,1}$ mode waves from said wave guide comprising, an annular chamber of rectangular cross-section adapted for response to said $TE_{1,1}$ mode waves formed as a rectangular wave guide having coaxially cylindrical inner and outer wide walls and disposed contiguously on the outside of said wave guide so that the wall of said wave guide provides said inner wide wall, four substantially equally spaced circumferentially arranged longitudinally disposed slots in the wall of said wave guide leading into said chamber through said inner wide wall, said slots having each a length substantially equal to one-half a $TE_{1,1}$ mode wave and being disposed with their longitudinal centers substantially along the center line of said inner wide wall, and an annular sheet of resistive material in said chamber lying in a plane substantially perpendicular to the longitudinal axis of said cylindrical wave guide and electrically connecting together said inner and outer wide walls along their respective center lines.

3. A mode filter for a wave guide transmission line comprising, a cylindrical wave guide section closed at one end, a rectangular wave guide disposed with its longitudinal axis perpendicular to the longitudinal axis of said cylindrical wave guide and communicating with said cylindrical wave guide through an opening in the wall thereof at said closed end for feeding microwave energy thereto, said cylindrical wave guide being thereby subject to excitation of microwave energy in a desired mode and an undesired mode of propagation, a filter for said undesired mode including an annular closed chamber of rectangular cross section having coaxial cylindrical wide walls and disposed contiguously on the outside of said cylindrical wall, a plurality of longitudinally disposed slots in said wall leading into said chamber of a length substantially equal to half the wave length of the energy in said undesired mode and adapted to transfer waves in said undesired mode through said wall into said chamber, the center point of said slots being located an odd number of quarter wave lengths of the energy in said undesired mode from said closed end, and an annular sheet of resistive material in said chamber electrically connecting said wide walls substantially in the plane of said center points of said slots.

References Cited in the file of this patent

UNITED STATES PATENTS

| | | |
|---|---|---|
| 2,151,118 | King | Mar. 21, 1939 |
| 2,267,289 | Roosenstein | Dec. 23, 1941 |
| 2,425,345 | Ring | Aug. 12, 1947 |
| 2,500,417 | Kinzer | Mar. 14, 1950 |